United States Patent

Wyatt

[15] 3,664,141
[45] May 23, 1972

[54] RIGID PIPE LAYING APPARATUS

[72] Inventor: Shelford S. Wyatt, P.O. Box 8, Esparto, Calif. 95627

[22] Filed: June 1, 1970

[21] Appl. No.: 42,401

[52] U.S. Cl. .................................................61/72.5, 37/80
[51] Int. Cl. .........................................E02f 5/10, F16l 1/00
[58] Field of Search .......................61/72.5, 72.6, 72.7, 72.1, 61/72.2; 37/193, 80

[56] References Cited

UNITED STATES PATENTS

| 536,339 | 3/1895 | Hanneborg | 61/72.5 |
|---|---|---|---|
| 1,991,919 | 2/1935 | Bruins | 61/72.5 |
| 3,528,255 | 9/1970 | Blinne | 61/72.6 |
| 3,170,301 | 2/1965 | Kelley | 61/72.1 X |

*Primary Examiner*—Jacob Shapiro
*Attorney*—Townsend and Townsend

[57] ABSTRACT

A trencher adapted to be secured to graders and like construction equipment is provided with a rearwardly and downwardly sloping pipe passageway which terminates at the aft end of the trencher and exhibits a gentle curvature permitting elastic deflection of the pipe as it moves through the passageway. The trencher is rigidly supported from the grader frame at the forward end above a throw-out plate and at a rearwardly spaced intermittent point to assure the formation of a straight line trench having a closely controlled and constant depth. Relatively rigid, endless pipe, which may include intermittent T-sections, is laid out over the ground, picked up by a pipe guidance and suspension device mounted to the forward end of the grader, moved into and through the passageway and placed into the trench as the grader moves along.

12 Claims, 5 Drawing Figures

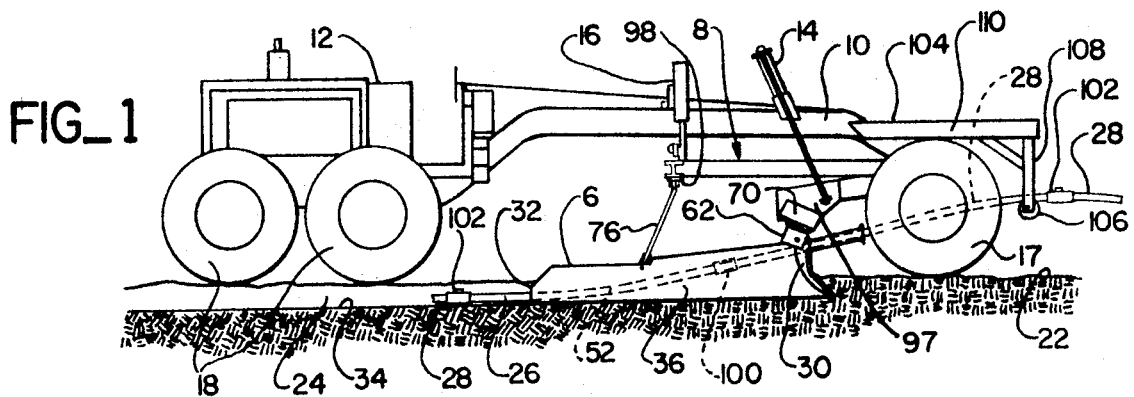
FIG_1
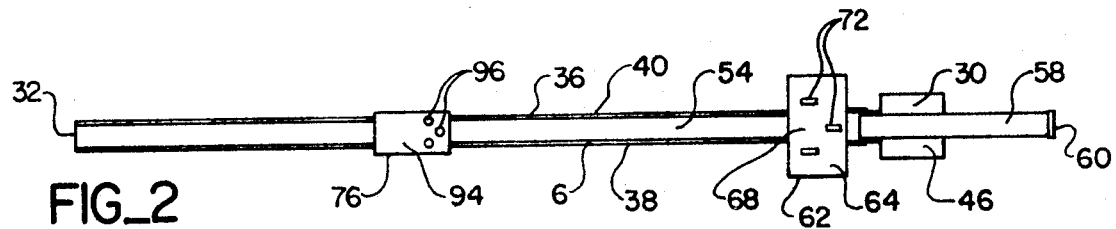
FIG_2
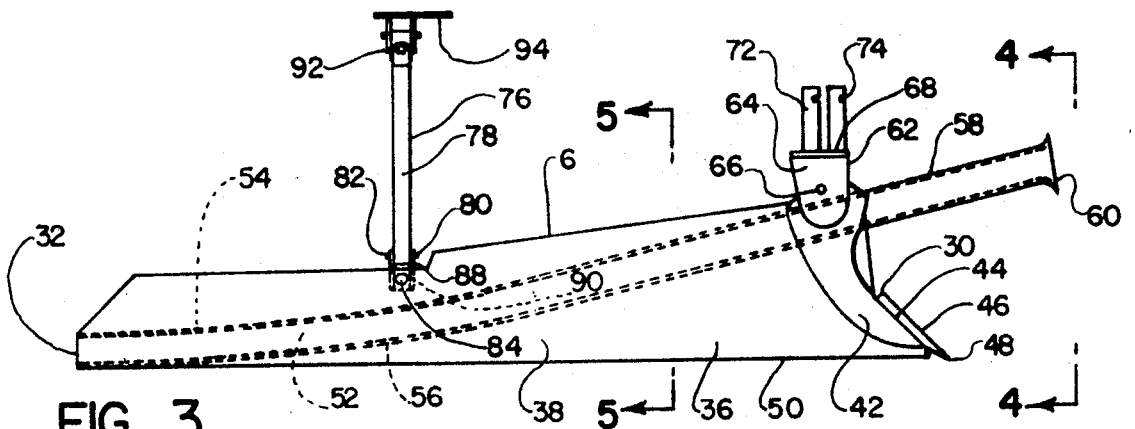
FIG_3
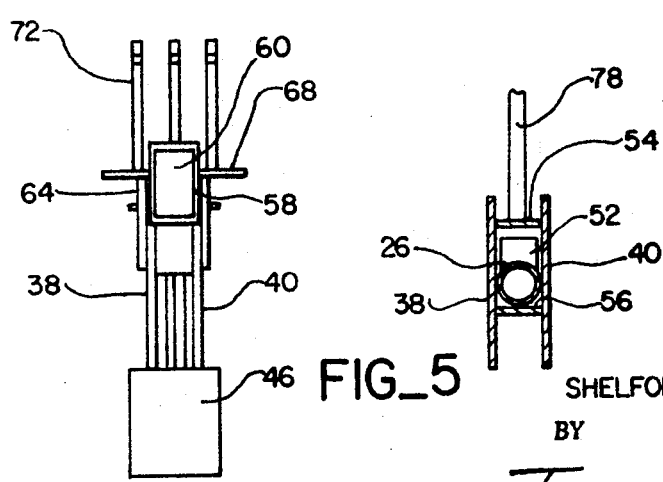
FIG_4   FIG_5
INVENTOR
SHELFORD S. WYATT
BY
Townsend and Townsend
ATTORNEYS

RIGID PIPE LAYING APPARATUS

BACKGROUND OF THE INVENTION

Underground pipe laying, particularly the laying of relatively small diameter pipe as is frequently encountered on irrigation projects, requires the laying of often thousands of feet of pipe. Trenches for the pipes must be opened, the pipe laid and, thereafter, the trenches must be closed again. This involves substantial and costly labor.

To reduce labor costs attempts have been made to mechanize the pipe laying by first providing automatic trenching machines and then laying the pipe and closing the trenches. Trenching machines, however, are relatively expensive and, under adverse soil conditions such as gravel, exhibit costly wear and tear. Moreover, the pipe must still be placed in the trench and covered with soil.

It is also known to provide a self-propelled vehicle, such as a tractor, store thereon a long, coiled length of flexible pipe, and lay the pipe in a trench opened by a conventional trencher mounted to the tractor. These devices usually provide a plow-shaped trencher that extends forwardly or rearwardly of the tractor and is suspended therefrom in a cantilever manner. The substantial pressures to which the trencher is subjected, particularly when working in hard soil, requires that it is relatively short. The flexible pipe is moved through a passageway defined by the trencher into the open trench. The relatively shortness of the trencher requires a sharp curvature of the pipe laying passageway so that semi-rigid or rigid pipe cannot be accommodated in the passageway.

Moreover, the installation of prior art pipe laying devices requires extensive alterations and/or additions to available general purpose equipment such as tractors or cats. These alterations and additions include, aside from the trencher per se, additional supporting frames, mounting linkages and the necessary hydraulics to operate the trencher and enable its raising and lowering. The alterations and additions are costly and, when not in use, are bulky and can inhibit maneuverability and/or the driver's visibility. Prior art approaches to the simultaneous trench digging and pipe laying, particularly the laying of semi-rigid and rigid pipe, have therefore not been very satisfactory.

The present invention provides apparatus for forming a trench and placing a continuous string of relatively rigid pipe into the trench. Briefly, the apparatus comprises an elongate, narrow body having a forward end and an aft end, ground moving means secured to the forward end for forming a trench in the ground through which the body can be drawn and pipe guidance means extending over the length of the body. The guidance means slope rearwardly and downwardly from an upper forward end of the body and terminate in a substantially horizontal position at a lower aft end of the body. The guidance means has a curvature of a sufficient curvature radius to enable the elastic deflection of pipe moving through the passageway. First mounting means for connection of the forward end of the body to a drawing vehicle, and second mounting means spaced rearwardly of the first mounting means for connection of an intermediate body portion to the drawing vehicle are provided to firmly guide and position the apparatus and control the orientation and depth of the trench formed by the ground moving means while enabling continuous lengths of relatively rigid pipe to pass through the pipe guidance means into the trench.

In the preferred embodiment of the invention the body is defined by laterally spaced upright plates which define side walls of the gently curved, downwardly and rearwardly oriented pipe passageway. The apparatus can be mounted to conventional graders having forward and aft drive and tracking wheels and a relatively high frame without the need for altering the vertically movable accessory attachment yoke or adding additional equipment, such as hydraulics, to the grader. The substantial spacing between the forward and aft wheels of the grader enables the use of relatively long bodies which have a length greatly in excess of that possible with prior art pipe laying devices. The great length is firmly supported by longitudinally spaced forward and aft connection means attached to the vertically movable grader yoke to stabilize the apparatus, maintain it in a straight path when it is drawn through the ground and control the trench depth and maintain it constant. Additionally, the connection means permit limited lateral movements of the aft end of the body so that curved trenches of a relatively large curvature radius can be formed.

The apparatus of the present invention is simple to construct, relatively lightweight and is of a sufficient size, particularly in length, so that even rigid steel pipe consisting of a multiplicity of joined steel pipe sections can be laid by simply passing the pipe over a suspension roller mounted forward of the grader, through the passageway of the trencher and into the dug trench. Pipe laying speeds of as much as ten times the pipe laying speeds attainable with prior art equipment are possible with the apparatus of the present invention. Substantial cost savings are thus assured. In addition, significant cost savings are provided by the present invention through the simplicity of the trencher, its ease of installation without substantial and costly alterations to equipment, and through the elimination of special equipment such as separate trench diggers.

BRIEF DESCRIPTION OF THE DRAWINGS

FIG. 1 is a side elevational view of the rigid pipe laying apparatus of the present invention mounted to a grader;

FIG. 2 is an enlarged plan view of the pipe laying apparatus;

FIG. 3 is an enlarged side elevational view of the pipe laying apparatus;

FIG. 4 is a front elevational view, taken on line 4—4 of FIG. 3; and

FIG. 5 is a sectional view taken on line 5—5 of FIG. 4.

DESCRIPTION OF THE PREFERRED EMBODIMENTS

Referring first to FIG. 1, a rigid pipe laying apparatus 6 constructed in accordance with the present invention depends from a vertically movable yoke or subframe 8 disposed below a main frame 10 of a drawing vehicle such as a conventional grader 12. The yoke comprises independently movable forward and aft members 97 and 98 secured to hydraulic actuators 14 and 16, respectively, for raising and lowering it and pipe laying apparatus 6. Grader 12 is of a conventional construction and includes tracking means such as spaced apart forward wheels 17 and aft drive wheels 18. The rigid pipe laying apparatus is disposed in the space between the forward and aft wheels and below main frame 10. During operation yoke 8 is lowered until the bottom of the pipe laying apparatus is disposed below ground 22. When the grader moves in a forward direction the pipe laying apparatus forms a trench 24 centered between the left hand and right hand wheel sets. An endless length of pipe 26 comprising end-to-end connected pipe sections 28 is passed from a forward end 30 of the pipe laying apparatus to an aft end 32 where it is deposited on trench bottom 34.

Referring now to FIGS. 2 through 5, pipe laying apparatus 6 comprises a main trench forming body 36 defined by laterally spaced upright plates 38 and 40 which extend from forward end 30 to aft end 32 of the body. A generally U-shaped brace 42 is disposed over the upright plates at their forward ends and welded thereto. The brace includes a downwardly and forwardly sloping edge 44 onto which a high-strength, abrasion-resistant throw-out plate or tooth 46 is demountably secured to permit its ready replacement. The tooth slopes forwardly and downwardly and terminates in a cutting edge 48 horizontally aligned with a lower edge 50 of body 36.

A gently curved pipe passageway 52 is disposed between plates 38 and 40 and slopes in a downward direction from the upper forward end to the lower aft end of the body 36 where the passageway has a substantially horizontal orientation. In the preferred embodiment of the invention plates 38 and 40 define the sides of the passageway, which has a rectangular configuration and a height exceeding its width, and parallel upper and lower transverse webs 54 and 56 connected, e.g. welded to the plates define the top and bottom of the passageway. The overall width of body 36, as determined by the required width of the passageway, is thereby held to a minimum. The webs have a substantially continuous large radius curvature to enable the passage of semi-rigid pipe, such as PVC pipe, or rigid pipe, such as standard steel pipe by merely elastically deflecting such pipe so that it returns to its original straight configuration when it leaves the passageway.

For the laying of two inch PVC or 1 ¼ inch steel pipe a pipe laying apparatus having an overall body length of about 10 feet, a height differential of pipe passageway 52 between the forward and aft ends of about 25 inches and a substantially continuous curvature of the passageway between its forward and aft ends provides a sufficiently large curvature radius so that the pipe deflects elastically as it passes through the passageway. For larger diameter pipe, say 4 inch PVC or 2 inch steel pipe, an overall body length of about 17 feet with a height differential between the forward and aft ends of the pipe passageway of about 30 inches again provides a sufficiently large curvature radius for the passageway so that the 2 inch steel pipe passing therethrough deflects elastically. For other pipe diameters the dimensions of the passageway, and therewith of body 36, are suitably adjusted.

A tubular pipe guidance member 58 is preferably secured to body 36 and extends forwardly thereof. The tubular member terminates in an outwardly flaring mouth 60 and is aligned with passageway 52. The tubular member extends the pipe passageway forward towards, and if desired, past the axles of forward wheels 17. Although it is preferred to construct passageway 52 in the above described manner by providing upper and lower webs 54 and 56 tubular member 58 can be extended rearwardly over the length of body 36 to body aft end 32 to fully define passageway 52. This embodiment of the invention has the advantage that the tubular member and the passageway can be prefabricated. In that instance the tubular member is suitably secured, e.g. welded to upright plates 38 and 40.

To maintain body 36 of the pipe laying apparatus steady when it is drawn through the ground and prevent it from moving in lateral or vertical directions, which would result in a trench 24 of uneven depth and can cause wedging of the body and substantial friction exerting excessive power demands on the grader a two point suspension for the body is provided. A first, forward connector 62 comprises a bracket 64 that is secured to brace 42 with a horizontally disposed pivot pin 66. A transverse web 68 of the bracket includes releasable connection means for removably securing the bracket and forward end 30 of body 36 to the grader. The grader has forward cross bar 70 with a plurality of rectangular apertures (not separately shown) engaging two and preferably three or more upright posts 72 extending from web 68 and defining the connection means. The posts are shaped so that they fit snugly into the apertures in cross bar 70 and they are triangularly arranged (see FIG. 2) with the center post being the forward-most post to match the arrangement of the apertures in cross bar 70. The posts further include slots 74 for securely connecting them to the cross bar in a known manner. Connection means for use with drawing vehicles having different attachment devices and configurations can be substituted as necessary.

A second rear connector 76 is defined by an upright post 78 which is secured to a portion of body 36 intermediate its ends, preferably closer to aft end 32 than to forward end 30. A lower universal joint 80 between posts 78 and body 36 is defined by transverse pins 82 and 84, a pair of spaced, opposing plates 38 and a block 90 disposed between and secured to plates 88. An upper universal joint 92 is similarly constructed as the lower joint and its free end is secured to a substantially horizontal connection plate 94 including mounting holes 96 for securing the plate to a rearwardly positioned member 98 of yoke 8. The universally movable second connector maintains body 36 steady as it is drawn through the ground, but permits some slight lateral movements between yoke 8 and aft end 32 of body 36 due to play in forward connection 62 and deflection of the body so that grader 12 can move along gentle, large radii curves without undue edging of the body for cutting gently curved, large radii trenches.

In operation pipe laying apparatus 6 is attached to a drawing vehicle such as grader 12 which has sufficient top clearance and frame length to enable the two point overhead suspension of body 36. The pipe laying apparatus can be installed on the grader without changes or alterations in its structure or hydraulic system by merely securing connection means 62 and 76 to independent forward and aft members 97 and 98 of yoke 8. This permits the leveling of pipe laying apparatus 6 by suitably raising or lowering the forward and/or aft yoke members.

Pipe sections 28 are laid end-to-end adjacent the desired path and connected with pipe connectors 100 or T-fittings 102 which permit the mounting of risers (not shown) after the pipe has been placed in trench 24.

A pipe pick-up device 104 is mounted to the forward end of grader 12. It comprises a roller 106 mounted between bars 108 that depend downwardly of the vehicle frame or a horizontally disposed forwardly extending beam 110 secured to the vehicle frame.

Pipe laying commences by hoisting the end of the pipe string over the pick-up device and placing it into passageway 52. The forward movement of grader 12 results in the cutting of trench 24 to the set depth by lifting ground overlying throw-out plate 46 upwardly and forming upright trench side walls which reduce the friction on upright plates 38, 40 of body 36. The vertically rigid connection between yoke cross bar 70 and forward end 30 of body 36 provides for excellent depth control and maintains the trench depth constant even under adverse, e.g. hard soil conditions.

The endless pipe string passes over pick-up device 104, into mouth 60 of tubular member 58 and through passageway 52 into the trench. As the grader moves along its path pipe is continuously lifted off ground 22 by pick-up device and passes continuously through the passageway 52. Relatively high speeds of as much as 300 feet per minute for the trench and pipe laying operation can be attained.

In irrigation applications pipe risers (not separately shown) are installed in T's 102 spaced along the length of the pipe string. Such installation requires that the T's face upwardly. By constructing passageway 52 so that it has a rectangular cross-section, a width permitting passage of the T-fittings and a height permitting passage of the open, transversely extending connection of the fitting while preventing it to rotate sideways, the desired orientation of the fittings after the pipe is deposited on the trench bottom is automatically obtained. Moreover, by constructing passageway 52 in this manner so that the minimum transverse dimension of the pipe string is in a lateral plane while the maximum transverse dimension (e.g. at the T-fittings) is in a vertical plane, the width of body 36, and therewith the width of the dug trench can be minimized to reduce power consumption and/or enable a speed-up in the work.

After pipe has been laid the trench is closed. Where no further work needs to be done on the pipe string, e.g. where risers or the like need not be installed, the trench can be closed by providing grader 12 with a suitable blade mounted behind of body aft end 32 which returns throw-up ground into the trench and, preferably, which compacts the ground.

I claim:

1. Apparatus for laying relatively rigid, continuous lengths of pipe below ground with a towing vehicle having a vehicle frame spaced above ground between forward and aft traction means, the apparatus comprising: an elongate, rigid, narrow body having a forward end and an aft end, ground moving means forming an integral part of the body for forming a trench in the ground through which the body can be drawn, a tubular passage for the pipe including a tubular member projecting forward of the forward end and terminating in a pipe receiving mouth portion for guiding the pipe into the tubular passage, the passage extending over the length of the body, sloping rearwardly and downwardly from an upper forward end of the body and terminating in a substantially horizontal position at the lower aft end of the body, the passage having a curvature of a sufficient curvature radius so that pipe in the passage is only elastically deflected, first mounting means for connection of the forward end of the body to the frame aft of the forward traction means, and second mounting means spaced rearwardly of the first mounting means for connection of an intermediate body portion to the frame aft of the first mounting means and forward of the aft traction means to thereby firmly guide and position the apparatus and control the orientation and depth of the trench formed by the ground moving means while enabling continuous lengths of relatively rigid pipe to pass through the passage into the trench.

2. Apparatus according to claim 1 wherein the second mounting means includes means permitting lateral movements of an aft portion of the body with respect to a vertical axis through the first mounting means to enable the formation of curved trenches.

3. Apparatus according to claim 1 wherein the ground moving means comprises a substantially flat throw-out plate mounted to the forward end in a forwardly and downwardly sloping position for lifting and throw-out of ground to form the trench whereby lateral pressure against the body and friction are reduced.

4. Apparatus according to claim 1 wherein the passage has a rectangular cross-section and a height exceeding its width.

5. Apparatus according to claim 1 wherein the first mounting means comprises a mounting bracket pivotable about a substantially horizontal axis and secured to the body portion adjacent the forward end, and including at least three upright connection members arranged in a wedge formation through mating apertures in a yoke of the drawing vehicle.

6. Apparatus for connection to a draw vehicle having a main frame, forward and aft tracking means and a raiseable yoke disposed below the frame and intermediate the tracking means, the yoke including means for attaching working accessories thereto, the apparatus comprising: trench forming means for expelling a volume of ground to form an elongate trench when the vehicle moves over the ground, means positioning the trench forming means aft of the forward tracking means and securing the trench forming means to the yoke, means defining an elongate passageway sloping rearwardly and downwardly, the passageway extending over substantially the full length of the trench forming means, the passageway terminating in a substantially horizontal aft end section rearwardly of the trench forming means and having a radius of curvature sufficiently large to effect elastic deformation of semi-rigid and rigid pipe passing through the passageway, means connecting the passage defining means with the trench forming means, and means spaced rearwardly of the first connection means, attached to the yoke and connected to an aft portion of the trench forming means for substantially rigidly holding an aft portion of the trench forming means against vertical movement to guide and stabilize the trench forming means when it is drawn through the ground.

7. Apparatus according to claim 6 wherein the passage defining means includes means defining a substantially rectangular passageway having a height exceeding its width for movement of pipes including T-fittings through the passageway and for a desired orientation to the T-fittings.

8. Apparatus for laying a continuous rigid pipe string in a trench comprising in combination:
   a drawing vehicle having an elevated frame, forward and aft support wheels supporting the frame above ground, and drive means for the wheels;
   an elongate, rigid trencher disposed beneath the frame and intermediate the forward and aft wheels, the trencher including a substantially flat, forwardly and downwardly sloping plate for the throw-out of soil from the trench and means maintaining a predetermined trench shape over a distance rearward of the throw-out plate;
   a gently curved, downwardly and rearwardly sloping pipe passage extending over substantially the full length of the trencher from an upper forward end to a substantially horizontal aft lower end substantially flush with a trench bottom, the passageway being enclosed by the trench form maintaining means, the radius of curvature of the pipe passage being sufficiently large so that pipe in the passage is only elastically deformed and returns to its original shape upon discharge from the passage;
   means connecting a forward trencher end to the frame at a location on the frame forward of the aft wheels for stabilization of the trencher when it is drawn through the ground and maintaining the depth of the trench bottom substantially constant.

9. Apparatus according to claim 8 wherein the passage defining means is positioned so that relatively rigid pipe extending forward of the forward trencher end extends above a forward wheel axis, and further including pick-up means movably supporting a section of substantially rigid pipe forward of the wheel axis at an elevation enabling elastic deflection of a continuous length of pipe from the passage defining means over the pick-up means and onto the ground supporting the pipe string.

10. Apparatus according to claim 9 including a vertically movable yoke carried by the frame and wherein the first and second connection means connect the trencher to the yoke to enable the raising and lowering of the trencher.

11. Apparatus according to claim 8 wherein the trench retaining means comprises upright, spaced apart plates disposed on sides of the pipe passage, and including means permitting lateral movements of the aft end of the side plates about a vertical axis through the forward connecting means for the formation of curved trenches having relatively large radii of curvature.

12. Apparatus according to claim 9 including a passage extension extending forwardly of the throw-out means towards the pick-up means and terminating in an outwardly flaring mouth portion for guiding the pipe from the pick-up means to the passageway.

* * * * *